United States Patent [19]
Westphal et al.

[11] 3,961,566
[45] June 8, 1976

[54] METHOD FOR FORMING PATCH TOP CONTAINER END AND CLOSURE MEMBER ASSEMBLY

[75] Inventors: Teddy M. Westphal, Chesterfield; Robert J. Hough, Ballwin, both of Mo.

[73] Assignee: Boise Cascade Corporation, Boise, Idaho

[22] Filed: Dec. 9, 1974

[21] Appl. No.: 530,547

[52] U.S. Cl. .............................. 93/36 B; 93/39.1 R; 93/55.1 R; 220/256; 220/359
[51] Int. Cl.² .......................................... B31B 1/90
[58] Field of Search ............. 93/36 B, 36 DA, 39 C, 93/39.1 R, 55.1 R, 55.1 M; 113/80 D, 80 DA, 121 R, 121 A, 121 AB, 121 C; 220/256, 258, 359; 215/298; 229/43 R

[56] References Cited
UNITED STATES PATENTS

| | | | |
|---|---|---|---|
| 3,422,522 | 1/1969 | Mojonnier | 93/36 B UX |
| 3,621,637 | 11/1971 | Sternau | 53/329 |
| 3,734,044 | 5/1973 | Asmus | 113/121 C |
| 3,734,333 | 5/1973 | Foss | 220/258 X |

*Primary Examiner*—James F. Coan
*Attorney, Agent, or Firm*—Lawrence E. Laubscher

[57] ABSTRACT

An assembly of a patch top container end and a reusable circumferentially-flanged closure member is disclosed, together with a method for forming the container end and introducing the same within the closure member, characterized in that the container end includes a circumferential tab portion which is folded back through an angle of 180° to a position between the body portion of the container end and the body portion of the closure member. The closure member is then mounted on the open end of a container with the closure member flange extending about the container, the container end being bonded to the extremity of the container end by a temperature or pressure responsive material.

11 Claims, 6 Drawing Figures

Temperature Or Pressure Responsive Adhesive Layer

METHOD FOR FORMING PATCH TOP CONTAINER END AND CLOSURE MEMBER ASSEMBLY

BACKGROUND OF THE INVENTION

As evidenced by the prior U.S. Pat. No. to Berch 2,135,479, Vogel U.S. Pat. No. 3,590,557 and Young et al U.S. Pat. No. 3,695,900, among others, it has been proposed in the prior art to close and seal the open end of a container by heat sealing across the open end a suitable end closure member. The use of a relatively thin foil or laminate "patch top" end closure members instead of the conventional relatively heavy gage metal ends having rolled seam connections has also been proposed (for example, in the "snack foods" packaging art). Furthermore, the use of reusable circumferentially-flanged overcaps is well known in the art (for example, in connection with tennis ball cans, and containers for snack foods, toys and the like).

BRIEF SUMMARY OF THE INVENTION

The present invention relates to an improved container closure assembly including a circumferentially-flanged closure member in which is mounted a patch top container end, and to the method of forming the patch top container end from a web of sheet material and introducing the same into the closure member, whereupon the assembly is mounted upon the open end of a container and the patch top container end is subsequently bonded to the extremity of the container to close and seal the same. In accordance with a characterizing feature of the invention, the patch top container end is provided with an integral tab portion that is connected with a circumferential portion of the main body portion of the end. During the formation of the patch top container end, the tab portion is folded through an angle of 180° into engagement with one face of the body portion of the container end, whereupon the container end is introduced into the closure member with the tab portion extending between and parallel with the body portions of the container end and the closure member. The advantage is thus presented that the closure member serves as the vehicle for transporting the relatively thin patch top container end to the open end of the container and for applying uniform pressure to the container end during the time it is being bonded to the extremity of the container open end.

Accordingly, a primary object of the present invention is to provide an improved method for forming a patch top container end and for introducing the patch top end into a reusable closure member, which includes the steps of cutting a first portion of a web of sheet material along a discontinuous line to define a tab portion, folding the tab portion about a fold line into engagement with a first face of a second portion of the web, severing from the web along a continuous line the second web portion to define the body portion of the container end, and introducing the patch top end within the closure member with the first face of the container end being adjacent the closure member and with the folded tab portion arranged between and parallel with said container end first face and the closure member body portion. According to a more specific object of the invention, the closure member is subsequently mounted on the open end of the container and the opposite second face of the patch top end is bonded to the open extremity of the container to close and seal the same. The web is formed of a suitable metallic or non-metallic material, for example, a metal foil (such as aluminum foil), a synthetic plastic material, paper or the like, or a laminate including layers of these metallic and/or non-metallic materials. In the preferred embodiment, the patch top end is a laminate, the outer layer of which defining the aforementioned second face of the patch top end comprising a layer of temperature or pressure responsive material, whereby the means for bonding the patch top end to the extremity of the container is carried by the patch top end and closure member assembly. In the alternative, the adhesive may be separately applied to the second surface of the end and/or to the extremity of the container prior to the mounting of the assembly on the open end of the container.

According to a more specific object of the invention, during the folding of the tab portion during the manufacture of the patch top container end, the tab portion is initially bent through a first angle of 90° to a first position normal to the web by a reciprocatory die member, and is subsequently progressively bent through a further angle of 90° by means of a conventional envelope-type folding device. To this end, the web material is conveyed longitudinally (preferably in a step-by-step manner), and the tab fold line is normal to the direction of feed of the web. The tab and body portions of the patch top end are then pressed together to impart a permanent set to the tab portion.

According to another object of the invention, each end of the discontinuous line defining the tab portion is undercut to extend laterally outwardly from the tab portion and slightly beyond the fold line, thereby to assure the subsequent complete severing of the patch top end from the web even in the event of slight misalignment of the severing die and/or the web.

A further object of the invention is to provide a container package in which the patch top end includes a removal tab which is folded downwardly upon the outer surface of the body portion of the end to a position between the end and the reusable closure member, whereby the tab is protected by the closure member during the distribution, display and sale of the package.

DESCRIPTION OF THE DRAWINGS

Other objects and advantages of the invention will become apparent from a study of the following specification, when viewed in the light of the accompanying drawings, in which.

Figure 1:
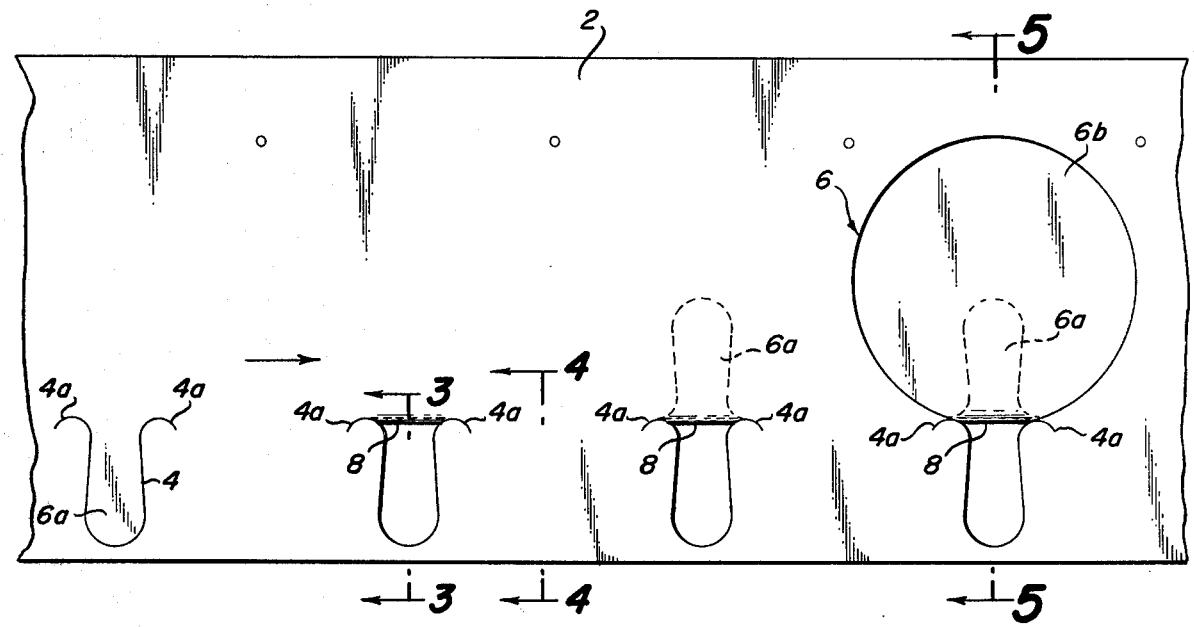
FIGS. 1 and 2 are somewhat diagrammatic top plan and side elevation views, respectively, illustrating the successive steps of forming a patch top container end from a web of sheet material.
Figure 2:
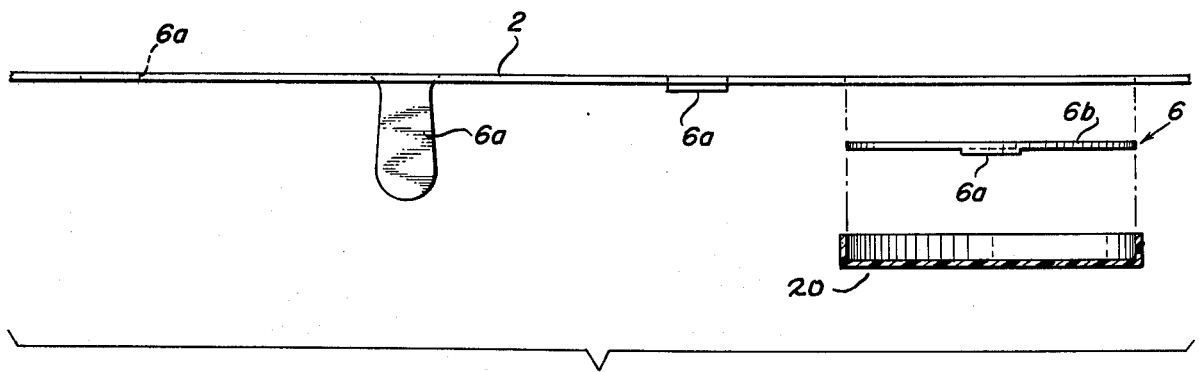
Figure 3:
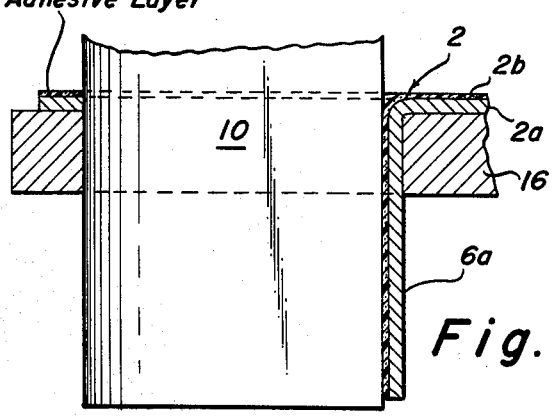
FIGS. 3-5 are sectional views taken along lines 3—3, 4—4 and, 5—5, respectively, of FIG. 1.

Referring first more particularly to FIGS. 1 and 2, in the illustrated embodiment the web of sheet material 2 is transported longitudinally — preferably in a step-by-step manner — in the direction illustrated by the arrow past a first cutting station at which the web is cut along the discontinuous line 4 to define the tab portion 6a of a patch top container end 6. The tab portion is bent downwardly about the fold line 8 through a first angle of 90° to a position normal to the web, as shown in FIG. 3, the fold line 8 being parallel to the direction of travel of the web. This bending operation is effected by the vertically reciprocable tool 10, which tool could be the cutting tool which defines the line 4 or a separate bending tool. For reasons that will be described below, the discontinuous line 4 includes at each end a semicircular undercut portion 4a which extends laterally outwardly from the tab portion 6a and slightly beyond the fold line 8.

Figure 4:
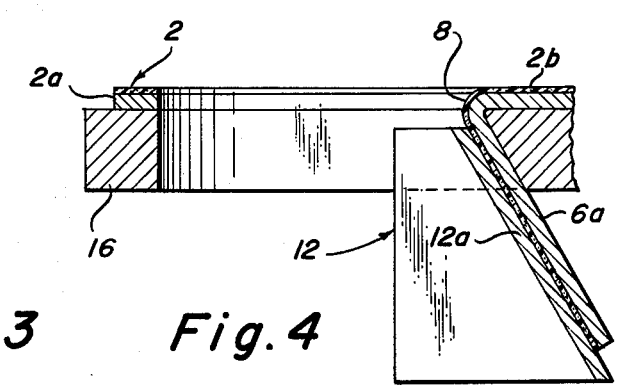

During subsequent travel of the web, the tab portion 6a is progressively bent through a further angle of 90° by conventional stationary envelope type folding means 12, as shown in FIG. 4. The folding means includes a planar bending surface 12a which is skewed at an angle to effect complete bending of the tab portion into engagement with the lower first surface of the web. The folded tab is pressed against the web between a pressing tool and the web support 16, thereby imparting a permanent set to the bent tab 6a.

Figure 5:
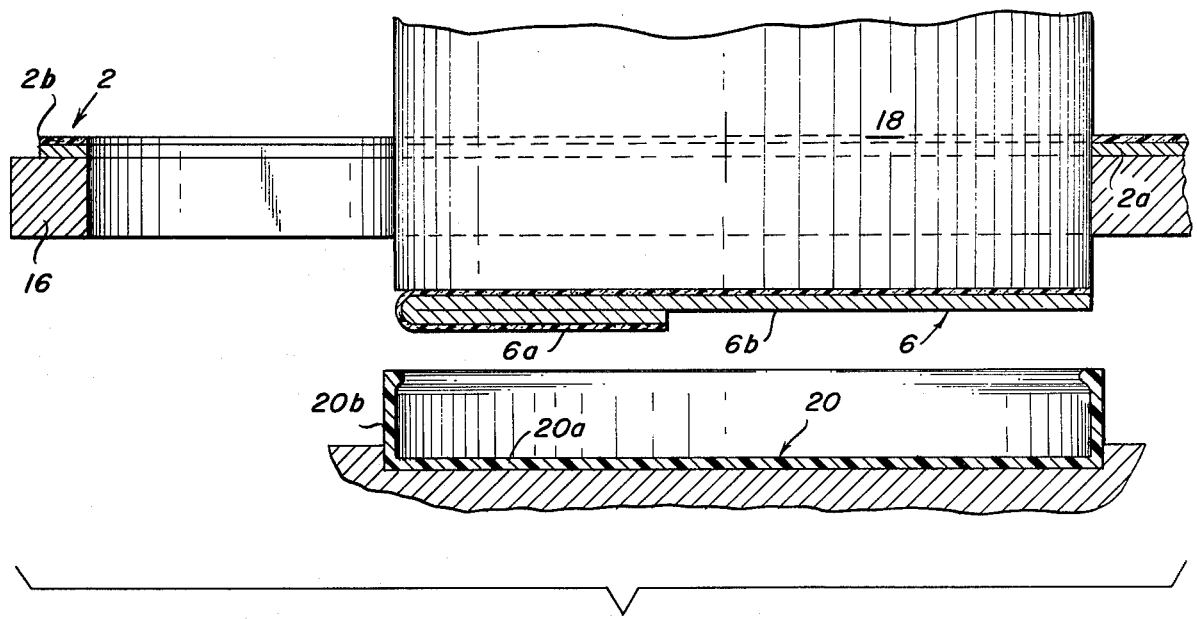

The web is then transported to a second cutting station (FIG. 5) at which the body portion 6b of the patch top end 6 is severed from the web by the vertically reciprocable cutting die 18. Owing to the undercut portions 4a at the ends of the cutting line 4, complete severing of the body portion 6b is assured even in the event of slight misalignment of the web 2 or the cutting tool 18. An overcap closure member 20 is fed beneath the cutting tool 18 in synchronism with the tool operation, said closure member normally being formed from a suitable synthetic plastic material and having a circular body portion 20a and an upwardly directed annular flange portion 20b. As the cutting tool 18 reaches the end of its downward stroke, it effects insertion of the severed patch top end 6 into the closure member, the tab portion 6a being arranged between the body portion 6b of the patch top end and the body portion 20a of the closure member.

The sheet material from which the web is formed is a light gage metallic or non-metallic material, such as aluminum foil, paper, a synthetic plastic material or the like, or a laminate of these materials. In the illustrated embodiment, the material comprises a laminate consisting of a first layer 2a of aluminum foil, and a second layer 2b of a temperature-responsive adhesive material (such as polyethylene, polypropylene, XBR resin or the like).

Figure 6:
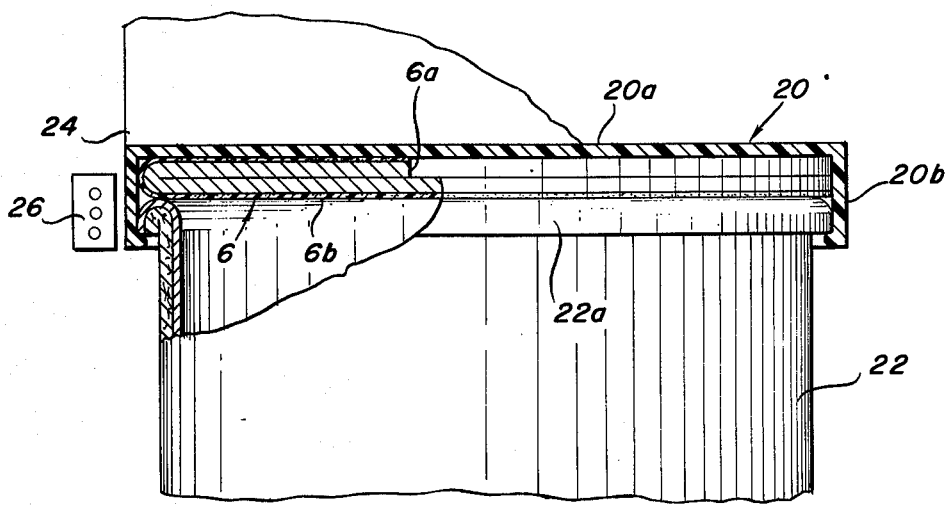
FIG. 6 is a detailed sectional view of the means for adhesively securing the patch top container end to the extremity of the open end of a container.

As shown in FIG. 6, the patch top end and closure member assembly is then mounted upon the open end of the container 22, which container in the illustrated embodiment comprises a foil-lined composite container having a rolled-back end flange 22a. The flange portion 20b of the closure member is mounted concentrically about the flange portion 22a of the container and the outer second face of the end body portion 6b is brought into contiguous engagement with the extremity of the container end. Heat and pressure is then applied to the patch top end by means of the pressing tool 24 and heating means 26, whereupon the patch top end is bonded to the extremity of the container, thereby to close and seal the container end.

Of course, in the event that the adhesive layer 2b consists of a pressure sensitive adhesive, the necessity of the heating means 26 is avoided. Furthermore, in the alternative where the web, and consequently, the patch top end, are not provided with a layer of adhesive, the adhesive may be applied to the patch top end and/or to the container extremity between the assembly steps of FIGS. 5 and 6.

While in accordance with the provisions of the Patent Statutes the preferred form and embodiment of the invention has been illustrated and described, it will be apparent to those skilled in the art that changes and modifications may be made without deviating from the inventive concepts. The disclosed sequence of steps could be performed on a web with one or more patches being produced per stroke, and if more than one patch is produced per stroke, the patches would be blanked from the web in an arrangement in which the pull-tabs of successive patches would extend in opposite directions and would be nested between the patch body portions, whereby the amount of scrap produced would be a minimum.

What is claimed is:

1. The method of forming from a web (2) of sheet material a patch top closure member (6) having body (6b) and tab (6a) portions, and assembling the closure member within a reusable overcap member (20) having a planar body portion (20a) and a continuous circumferential flange portion (20b), which comprises the steps of:
    a. cutting a first portion of the web along a discontinuous line (4) to define the tab portion (6a) of the closure member;
    b. initially bending the tab portion about a fold line (8) through an angle of 90° to a position normal to the web;
    c. subsequently progressively bending the tab portion about said fold line through a further angle of 90° to a reversely bent position in engagement with a first face of a second portion of the web;
    d. severing said second web portion from the web to define the patch top closure member (6), the body portions of said closure and overcap members having congruent circumferential configurations; and
    e. introducing the patch top closure member within the overcap member in seated engagement with the body portion thereof, the first face of said closure member facing said overcap body portion and said tab portion being arranged between said first face and said overcap body portion.

2. The method as defined in claim 1, wherein said tab portion is initially bent through the first 90° angle by a reciprocatory die member.

3. The method as defined in claim 2, wherein the fold line is parallel with the longitudinal axis of the web, and further wherein the tab portion is progressively bent through said further angle of 90° by longitudinally feeding the web to cause said tab portion to pass through an envelope type folding means.

4. The method as defined in claim 3, wherein the discontinuous line defining said tab portion terminates at each end in an undercut portion which extends laterally outwardly from said tab portion and slightly beyond said fold line in the direction of said second web portion, whereby upon severing of the second web portion to define the closure member, complete severing of the second web portion from the web is assured.

5. The method as defined in claim 1, and further including the step, following the step of bending the tab portion through the further angle of 90° to the reversely bent portion, of pressing the tab portion against said first face adjacent said fold line to cause the web material to take a permanent set.

6. The method of forming from a web (2) of sheet material a patch top closure member (6) having body (6b) and tab (6a) portions, and assembling the closure member within a reusable overcap member (20) having a planar body portion (20a) and a continuous circumferential flange portion (20b), which comprises the steps of:
- a. cutting a first portion of the web along a discontinuous line (4) to define the tab portion (6a) of the closure member;
- b. folding the tab portion reversely about a fold line into engagement with a first face of a second portion of the web;
- c. supporting the overcap member with the flange portion thereof adjacent and facing said first face of the second web portion;
- d. severing the second web portion from the web by a reciprocatory cutting tool to define the patch top closure member, said severing being accomplished during an intermediate stage of the working stroke of the tool; and
- e. introducing the severed patch top closure member within the overcap member by said reciprocatory tool during the final stage of the working stroke thereof, the first face of said closure member facing said overcap body portion being arranged between said first face and said overcap body portion.

7. The method as defined in claim 6, and further including the steps of
- f. mounting the assembled closure and overcap members upon the open end of a container with the flange portion of the overcap member arranged concentrically about the container and with the closure member in engagement with the extremity of the container open end; and
- g. bonding to the extremity of the container open end the second face of the closure member which is remote from the body portion of the overcap member.

8. The method as defined in claim 7, wherein the body portions of said closure and overcap members have circular configurations.

9. The method as defined in claim 7, wherein said web comprises a laminate the second face of which comprises a relatively thin layer of bonding material.

10. The method as defined in claim 9, wherein said layer of bonding material consists of a pressure-sensitive adhesive.

11. The method as defined in claim 9, wherein said layer of bonding material consists of a temperature-responsive material, said bonding step including heating the temperature-responsive material to bond the container end to the free extremity of the container open end.

* * * * *